United States Patent Office 2,807,599
Patented Sept. 24, 1957

2,807,599
POLYMERS OF DIVINYL BENZENE MONOEPOXIDE

Robert Emmett Burk, West Chester, Pa., and George Esler Inskeep, Wilmington, Del., assignors to E. I. du Pont de Nemours and Company, Wilmington, Del., a corporation of Delaware No Drawing. Application January 28, 1955,
Serial No. 484,818

12 Claims. (Cl. 260—41)

This invention relates to a new class of organic polymeric materials. More particularly, it relates to new polymeric compounds containing epoxy groups.

Polymeric epoxides, i. e., polymers containing epoxy groups,

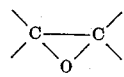

also called oxirane groups, are becoming increasingly important in the chemical industry. These polymers are capable of reacting through their epoxy groups with various reagents such as amines and acids to give products which, depending upon the reagent and the experimental conditions, may either retain their original linearity or become crosslinked and therefore insoluble and infusible. These modified epoxy polymers are finding important uses in such fields as textile sizing, adhesives, laminating resins, finishes for metal and other surfaces, treatment of leather, and in other applications.

Polymeric epoxides may be obtained through vinyl type addition polymerization of epoxy monomers containing ethylenic unsaturation, an example of such a monomer being allyl glycidyl ether. However, there are very few known monomers containing an epoxy and a vinyl group.

It is an object of this invention to provide new polymeric materials. A further object is to provide new polymers containing epoxy groups. A still further object is to provide new polymers containing epoxy groups which can be crosslinked through opening of said epoxy groups to give three dimensional organic solvent insoluble materials. Another object is to provide polymers which are capable of laminating glass fabrics at low pressures. Other objects will appear hereinafter.

The objects of this invention are accomplished by providing epoxy containing polymers of divinyl benzene monoepoxide, a compound having the formula

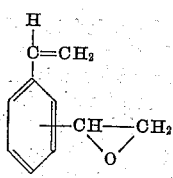

These polymers are obtained by addition polymerization of the monomeric component, or where a copolymer of divinyl benzene monoepoxide with ethylenically unsaturated monomers is desired, by addition polymerization of monomeric components by means of free radical producing initiators, leaving the epoxy groups largely or substantially unaffected.

Divinyl benzene monoepoxide is a novel compound which is more particularly described and claimed in copending application S. N. 484,817, filed herewith. Divinyl benzene monoepoxide is prepared by reacting divinyl benzene with a peracid such as peracetic acid in substantially equal molar amounts. This converts one of the double bonds to an oxirane group, leaving the other substantially unaffected. The resulting divinyl benzene monoepoxide is obtained as a reactive, but distillable liquid which can be polymerized or copolymerized by means of the free radical producing catalysts to vinyl polymers containing epoxide groups. The vinyl epoxy polymers can then be crosslinked by means of acidic or basic catalysts or crosslinking agents which open the epoxy groups. Conversely divinyl benzene monoepoxide can first be polymerized in the presence of ionic catalysts, e. g. acids, to give polymers of the polyethylene oxide type which do not contain epoxy groups except possibly as end groups, and these polymers can be further polymerized through their vinyl groups. The latter method when used in the polymerization of divinyl benzene monoepoxide, however, will result in relatively unstable linear polymers of short shelf life due to the reactivity of the vinyl group, unless vinyl polymerization inhibitors are present and will give rise to crosslinked polymers on contact with free radicals arising from oxygen or remaining in the monomer from the preparation step.

A typical preparation of divinyl monoepoxide is described below, all parts being in weight.

A reaction vessel was charged with 790 parts of commercial divinyl benzene, 1750 parts of benzene and 1160 parts sodium bicarbonate. The reaction mixture was stirred vigorously and cooled externally until the internal temperature dropped to 10° C. To the stirred mixture maintained at 10° to 15° C. was then added gradually 815 parts of a 40% peracetic acid solution in acetic acid (1.25 moles of peracetic acid/one mol of divinyl benzene) over a period of two hours after which the reaction mixture was stirred with cooling for an additional 5 hours. To the reaction mixture was then added 2000 parts of water. The benzene layer was separated from the water and passed through a 300 mesh screen to remove all solid particles and then washed with 500 parts of a 5% solution of sodium hydroxide in water. The benzene solution of the product was inhibited by the addition of 4 parts of trinitrobenzene, dried over anhydrous sodium sulfate and stored under refrigeration until distillation could be carried out. The divinyl benzene monoepoxide was obtained on fractional distillation after the benzene solvent had been removed by flash distillation at aspirator pressures (15–25 mm. Hg) with a maximum bath temperature of 45° C. The various fractions obtained as distillates included 102.8 parts of vinylbenzene monoepoxide (B. P. 65° C. at 1 mm.). This corresponds to 16.4% yield based on peracetic acid.

*Analysis.*—Calculated $C_{10}H_{10}O$: C, 82.3; H, 6.8; O, 10.9. Found: C, 82.3; H, 7.3; O, 9.7 (oxygen determined by epoxide oxygen method).

Due to the fact that impurities and isomers are involved in the starting material refractive index measurements were not used for identification of the product. In addition to analyses however other indications that the compound had the divinyl monoepoxide structure are furnished by the method of preparation and by infra red spectra, which show absorption at three wave lengths characteristic of a terminal unsaturated group. Moreover the ready polymerization of divinyl benzene monoepoxide as described hereinbelow by free radical polymerization also confirms the presence of the vinyl group.

The present invention is illustrated in greater detail by the following examples, in which parts are by weight unless otherwise noted. The examples also illustrate an important use of the polymers of this invention, viz. their application as laminating resins in obtaining uncured laminates which are postformable.

EXAMPLE 1

Free radical polymerization

In a reaction vessel was placed 80 parts of divinyl benzene monoepoxide, 0.8 part of benzoyl peroxide and 720 parts of benzene. The reaction vessel was blanketed with nitrogen and maintained at a temperature of 80° C. for a period of 3 days. The reaction mixture was then dropped into 4 times the volume of the reaction mixture of methanol. The precipitated polymer was washed, filtered and air dried. The inherent viscosity of the polymer was found to be 0.9. The polymer was redissolved in acetone and 40% on the basis of the polymer of 2'2'-bis-(p-hydroxyphenyl)propane commercially available as "Bisphenol A" was added to the reaction mixture. The resulting highly viscous solution was spread evenly on five 6 x 6" squares of heat cleaned glass cloth and then dried at air temperatures. The uncured impregnates were found to contain 32% by weight of glass.

The uncured impregnates were placed into a chase and compressed at 19 p. s. i. for 30 minutes at a temperature of 190° C. in a press. The resulting laminate was clear, indicating good adhesion to the glass, and free of defects. The following properties of the laminate were determined by ASTM methods: tensile strength, $24.7 \times 10^3$ p. s. i.; flexural strength, $35.3 \times 10^3$ p. s. i.; compressive strength, $17.7 \times 10^3$ p. s. i.; flexural modulus, $1.84 \times 10^6$ p. s. i.; Izod impact strength, 8.6 ft. lb./inch; Rockwell hardness, M-84.

EXAMPLE 2

The polymerization described in Example 1 was repeated. Upon polymerization the polymer was not precipitated, but 15% by the weight of the dissolved polymer, determined independently, of pyridine as a crosslinking agent was added to the dissolved polymer. Heat cleaned glass cloth was dipped into the viscous solution and air dried at 80° C. until a constant weight was obtained, indicating that all the solvent had been removed. The dry impregnates containing 44% by volume of glass were then stored for 2 weeks, and then compression molded at a pressure of 20 p. s. i. for 30 minutes at a temperature of 190° C. Tough clear laminates were obtained and the following properties were determined by ASTM methods: tensile strength, $30.8 \times 10^3$ p. s. i.; flexural strength, $36.9 \times 10^3$ p. s. i.; compressive strength, $20.3 \times 10^3$ p. s. i.; flexural modulus, $2.95 \times 10^6$ p. s. i.; Izod impact strength, 10.4 ft. lb./inch; Rockwell hardness, M 107; flexural modulus at elevated temperatures:

23° C.=$2.95 \times 10^6$ p. s. i.    165° C.=$2.36 \times 10^6$ p. s. i.
75° C.=$2.75 \times 10^6$ p. s. i.    200° C.=$2.45 \times 10^6$ p. s. i.
130° C.=$2.61 \times 10^6$ p. s. i.   258° C.=$2.29 \times 10^6$ p. s. i.
150° C.=$2.40 \times 10^6$ p. s. i.

EXAMPLE 3

A reaction vessel was charged with 22.5 parts of divinyl benzene monoepoxide, 22.5 parts of purified styrene, 135 parts of benzene as the solvent for the polymer and 0.5 part of alpha, alpha'-azobis-(gamma-dimethylvaleronitrile) as the initiator for the vinyl polymerization. The reaction vessel was flushed with nitrogen and capped and heated at 50° C. for a period of 3 days. The yield of copolymer was approximately 90% as determined by taking a small sample from the reaction medium and precipitating with methanol. To 75 parts of the resulting solution of polymer in benzene was added 6.0 parts of "Bisphenol A" and the well stirred mixture was spread on five 6 x 6" squares of glass cloth (No. 112). The impregnates were dried at 70° C. for a period of 1 day until all solvent had been removed. The dry impregnates containing 50% by volume of glass were placed in 1/16" chase and compressed at 20 p. s. i. at 180° C. for 30 minutes. A smooth surfaced, clear and void-free laminate was obtained. The physical properties of the laminate were tested by ASTM methods and the following results were obtained. Flexural strength, $54.1 \times 10^3$ p. s. i.; compressive strength, $30.4 \times 10^3$ p. s. i.; flexural modulus, $2.56 \times 10^6$ p. s. i.; Rockwell hardness, M-86.

EXAMPLE 4

To a reaction vessel was charged 50 parts of divinyl benzene monoepoxide, 50 parts of methyl methacrylate, 1 part of benzoyl peroxide and 700 parts of benzene as reaction medium. The reaction vessel was heated under a blanket of nitrogen for a period of three days at a temperature of $75 \pm 3°$ C. The reaction vessel was then cooled to room temperature and the reaction mixture poured into "Skellysolve" E (a mixture of saturated hydrocarbon solvents), filtered and dried, giving yield of approximately 90% of copolymer.

Forty parts of the polymer were dissolved in 160 parts of acetone and 8 parts of "Bisphenol A" was added to the solution. The resulting viscous solution was spread on 5 plies of 6 x 6" heat treated glass cloth, which were then placed in a chase and compressed at a temperature of 150° C. under 200 p. s. i. pressure for a period of 30 minutes. Clear smooth surface laminates, which were almost transparent were obtained from the pressing operation. The volume loading of the glass was calculated to be 34%.

The following physical properties as measured by ASTM methods were obtained: tensile strength, $22.0 \times 10^3$ p. s. i.; flexural strength, $32.1 \times 10^3$ p. s. i.; flexural modulus, $1.89 \times 10^6$ p. s. i.; Rockwell hardness, M 106.

EXAMPLE 5

To a reaction vessel was charged 11.2 parts of divinyl benzene monoepoxide, which by analysis contained 9.7% of epoxy oxygen, 100 parts of benzene and 0.1 part of benzoyl peroxide. The reaction mixture was heated under a blanket of nitrogen at 70–75° C. for a period of 90 hours and then poured into excess methanol causing the soluble polymer to coagulate. The polymer was a hard, somewhat brittle very transparent material, having an inherent viscosity of 0.11 in benzene at 25° C. The epoxide oxygen value obtained on analysis (9.7%) indicated that substantially no change had occurred on the epoxide group during vinyl polymerization. On heating the polymer to approximately 200° C. the polymer partially fused and became completely insoluble in benzene. Similar results were obtained at lower temperature when "Bisphenol A" was admixed with the polymer prior to precipitation, thus indicating crosslinkage, however, in the latter case, the polymer was fusible and moldable.

EXAMPLE 6

Ionic polymerization

To a reaction vessel, cooled to −30° C., was charged 100 parts of divinyl benzene monoepoxide and 450 parts of chloroform. The reaction mixture was stirred vigorously and 1 part of boron fluoride in the form of its ether complex was added as initiator. After 30 min. the reaction was short-stopped. On removing the solvent a clear nearly colorless solid was obtained. Conversion to non-volatile material was 100%. The ionic polymer when in solution gelled into an insoluble polymer on standing at room temperature. Crosslinking could also be caused by adding 1% of benzoyl peroxide and heating for less than 10 minutes at 80° C.

The polymers of this invention are generally prepared by polymerizing the monomeric components with the help of free radical producing initiators such as inorganic and organic peroxides, e. g. hydrogen peroxide, benzoyl peroxide, tertiary butyl hydroperoxide, and the recently developed azonitrile initiators described in U. S. Patent 2,471,959. In the free radical producing initiators, as opposed to ionic catalysts, polymerization takes place solely or preponderantly through the vinyl groups, leaving the epoxy groups or at least a substantial portion of them intact. Thus the polymers of this invention contain as a repeating unit the divinyl benzene monoepoxide group

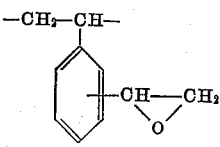

As shown in the examples hereinabove, the polymers of this invention can be crosslinked through opening of the epoxy groups to give three dimensional, organic solvent insoluble materials. The crosslinking may be achieved by the application of heat alone or by the addition of crosslinking agents such as dihydroxy phenols, pyridine, dicyandiamides and the like, which are compounds capable of reacting with an epoxy group.

Although it is possible to cure the polymers of this invention by heat alone it is preferred to use cross-linking agents. Such crosslinking agents permit extended flow of the polymer prior to setting and thus give rise to a more homogeneous product. The particular value of the resins of this invention lies in the reinforced plastic field. The resins can be used with any reinforcing agents in a wide proportion. Preferred reinforcing agents are woven and non-woven glass fibers. The amount of reinforcing material preferred varies from 10 to 70% by weight of the filled composition.

Copolymers of divinyl benzene monoepoxide can be prepared with any other polymerizable ethylenically unsaturated compounds and particularly with vinyl and vinylidene compounds, i. e. compounds having a terminal methylene group attached by a double bond to the adjacent carbon. Examples of such ethylenically unsaturated epoxy free compounds are vinyl and vinylidene halides, such as vinyl fluoride, vinyl chloride, acrylic, alkacrylic acids, esters, nitriles and amides such as acrylic acid, methacrylic acid, methyl methacrylate, acrylonitrile, vinyl carboxylates such as vinyl acetate, vinyl butyrate. Two or more vinyl or vinylidene monomers may be polymerized with divinyl benzene monoepoxide. Vinyl monomers containing epoxy groups such as glycidyl methacrylate may also be polymerized with divinyl benzene monoepoxide. In the copolymerization of divinyl benzene monoepoxide the ratio of the comonomers in the resulting polymer may be varied over a wide range and is not limited by the nature of divinyl benzene monoepoxide, but more by the end application of the polymer. Thus for crosslinking purposes it is preferred to have compositions containing at least 10% of divinyl benzene monoepoxide.

The polymerization conditions are not very critical. In general, there is used between 0.01 and 5% of the free radical producing initiator by weight of the total polymerizable materials. If a copolymer is to be prepared any desirable relative proportions of the polymerizable monomers can be used, depending on the application of the resulting polymer. Polymerization can be carried out in the bulk, i. e. without added diluent, but is preferably carried out in an unpolymerizable organic solvent, which may or may not be a solvent for the polymer, e. g. the ethylenically saturated aliphatic, cycloaliphatic or aromatic hydrocarbons such as n-hexane, cyclohexane, benzene, toluene, xylenes and the like. Bulk polymerization will give rise to a solid fused polymer which dissolves only with difficulty. Heating of the polymer to melt it may result in crosslinking during melting. With active initiators, the polymerization temperature can be as low as 0° C. and as high as 100° C., a generally suitable range being from 20° C. to 80° C. Temperatures above 100° C. should preferably be avoided, as opening of the epoxy ring resulting in crosslinking may occur. Superatmospheric pressure can be used and is desirably used with gaseous comonomers, such pressures varying between 1 atmosphere and the maximum pressure the equipment can withstand, a useful range being between 2 and 1500 atmospheres. The pressure can be produced by the pressure, either autogenous or superimposed, of the gaseous monomers at the reaction temperature or it can be that produced by an extraneous inert gas such as nitrogen air or carbon dioxide.

The copolymers of divinyl benzene monoepoxide are valuable resins useful for laminating purposes. They possess the advantage over many other laminating resins in that the crosslinking reaction may be carried out at low pressures. An added advantage is the stability of the resin when polymerized through the vinyl group. Thus reinforcing materials such as glass fibers may be impregnated with the resin and stored for long periods of time without causing crosslinking of the polymer. By the process of this invention post-formable resin reinforced sheets may be mass produced and pressed into the desired objects at the desired time. The crosslinked reinforced plastics made from the polymers of this invention have outstanding stiffness properties and when crosslinked with certain compounds such as pyridine show outstanding high temperature retention of stiffness. The copolymers of divinyl benzene monoepoxide further have the general usefulness of resinous materials in coating, or molding composition or as intermediates which may be further reacted through the epoxide group when polymerized through the vinyl group and vice versa through the vinyl group when polymerized through the epoxy group.

As many apparently widely different embodiments of this invention may be made without departing from the spirit and scope thereof, it is to be understood that this invention is not limited to the specific embodiments thereof except as defined in the appended claims.

We claim:

1. An epoxy-containing copolymer of divinyl benzene monoepoxide with a polymerizable epoxy-free vinyl monomer, each of the said copolymer components being polymerized through a vinyl group.

2. A polymer as set forth in claim 1 in which the epoxy-free vinyl monomer is styrene.

3. A polymer as set forth in claim 1 in which the epoxy-free vinyl monomer is methyl methacrylate.

4. A crosslinked, insoluble homopolymer of divinyl benzene monoepoxide polymerized through the vinyl group.

5. A crosslinked insoluble polymer as set forth in claim 4 containing from 10 to 50% by weight of the resin of 2,2 bis(p-hydroxyphenyl) propane as the crosslinking agent.

6. A crosslinked insoluble polymer as set forth in claim 4 containing from 5 to 30% by weight of the resin of pyridine as the crosslinking agent.

7. A crosslinked insoluble homopolymer of divinyl benzene monoepoxide polymerized through the epoxy group and crosslinked through the vinyl group.

8. A crosslinked insoluble polymer containing divinyl benzene monoepoxide, said polymer obtained by copolymerizing divinyl benzene monoepoxide with a polymerizable epoxy free vinyl monomer and crosslinked through the epoxide group.

9. A crosslinked insoluble polymer as set forth in claim 8 in which the epoxide free vinyl monomer is styrene.

10. A crosslinked insoluble polymer as set forth in claim 8 in which the epoxide free vinyl monomer is methyl methacrylate.

11. A composition of matter comprising from 15 to 85% by weight of a polymer of divinyl benzene monoepoxide, from 10 to 70% by weight of glass fibers and from 1.5 to 45% by weight of a crosslinking agent capable of reacting with two epoxide groups.

12. A polymer of divinyl benzene monoepoxide, said polymer being of the class consisting of homopolymers of divinyl benzene monoepoxide and copolymers of divinyl benzene monoepoxide with compounds having at least one terminal $>C=CH_2$ group.

References Cited in the file of this patent

UNITED STATES PATENTS 2,687,404     Robertson     Aug. 24, 1954